(12) United States Patent
Johnson

(10) Patent No.: US 6,799,805 B2
(45) Date of Patent: Oct. 5, 2004

(54) SINGLE BEAM AIRCRAFT PASSENGER SEAT

(75) Inventor: Glenn A. Johnson, King, NC (US)

(73) Assignee: BE Aerospace, Inc., Wellington, FL (US)

(*) Notice: Subject to any disclaimer, the term of this patent is extended or adjusted under 35 U.S.C. 154(b) by 0 days.

(21) Appl. No.: 10/305,798

(22) Filed: Nov. 27, 2002

(65) Prior Publication Data

US 2004/0100137 A1 May 27, 2004

(51) Int. Cl.[7] .................. A47C 7/02; A47C 15/00; B64D 11/06
(52) U.S. Cl. ............... 297/452.2; 297/452.19; 297/248; 297/411.38; 244/122 R
(58) Field of Search .............. 297/452.2, 452.19, 297/248, 411.38; 244/122 R, 118.6

(56) References Cited

U.S. PATENT DOCUMENTS

| | | | |
|---|---|---|---|
| 3,982,785 A | * | 9/1976 | Ambasz ...................... 297/160 |
| 4,229,040 A | * | 10/1980 | Howell et al. ........... 297/440.1 |
| 4,776,533 A | | 10/1988 | Sheek et al. |
| 5,169,091 A | | 12/1992 | Beroth |
| 5,409,186 A | * | 4/1995 | Chow ...................... 244/122 R |
| 5,553,923 A | * | 9/1996 | Bilezikjian ............... 297/452.2 |
| 5,558,401 A | * | 9/1996 | Singla Casasayas ........ 297/232 |
| 5,575,533 A | * | 11/1996 | Glance .................... 297/452.2 |
| 5,636,898 A | | 6/1997 | Dixon et al. |
| 5,775,642 A | | 7/1998 | Beroth |
| 5,871,318 A | | 2/1999 | Dixon et al. |
| 5,957,407 A | * | 9/1999 | Auestad ................... 244/118.6 |
| 6,027,167 A | * | 2/2000 | Blomdell et al. ......... 297/216.1 |
| 6,375,265 B1 | * | 4/2002 | Hubner et al. ......... 297/411.32 |
| 6,478,256 B1 | * | 11/2002 | Williamson ............. 244/122 R |
| 2003/0094542 A1 | * | 5/2003 | Williamson ............. 244/122 R |
| 2003/0094840 A1 | * | 5/2003 | Williamson ................. 297/248 |

* cited by examiner

Primary Examiner—Peter M. Cuomo
Assistant Examiner—Sarah C. Burnham
(74) Attorney, Agent, or Firm—Adams Evans P.A.

(57) ABSTRACT

A passenger seat, including at least one leg assembly having fore and aft attachment elements for attachment to a supporting surface and a single laterally-extending beam carried by the leg assembly in vertically spaced-apart relation to the fore and aft attachment elements, and first and second laterally spaced-apart seat frames positioned on respective opposite sides of the leg assembly and mounted on the beam for being supported thereby.

9 Claims, 10 Drawing Sheets

SINGLE BEAM AIRCRAFT PASSENGER SEAT

TECHNICAL FIELD AND BACKGROUND OF THE INVENTION

This invention relates to an aircraft seat, particularly an aircraft passenger seat, with a single seat beam. Aircraft passenger seats are typically constructed from modular components, the size, weight and construction of which are dictated by many considerations, including fuselage dimensions, aesthetic and safety considerations. Many of these requirements are imposed by law or regulation. The lower seat chassis is constructed of leg modules, while the upper seat is constructed of section assembly modules. In prior art seating systems the leg modules and section assembly modules are connected by mounting both to a pair of parallel beams that extend laterally from one side of the seat or seat assembly to the other.

The location of the upper seat section modules is controlled by the aircraft fuselage lines, statutory aisle requirements and carrier preferences within these parameters. The location of the leg modules is governed by the positions of the floor tracks that extend along the length of the fuselage and to which the seats are secured by track fittings on the bottom of the leg modules. The position of the floor tracks is generally fixed and permanent.

Within these requirements manufacturers of aircraft are constantly refining seat designs to achieve more comfort and utility within carrier-imposed restraints on cost, weight, maintenance down-time, and safety. The seat beams are structural elements that are carefully designed and tested to withstand specified loads. Prior art designs require a pair of parallel beams to provide the necessary structural integrity. These beams add weight to the overall seat design, increase required inventory of parts, increase design and assembly expense, and take up space under the seat that could otherwise be used for more foot and leg room, or stowage of carry on baggage.

The present invention relates to a passenger seat that has improved comfort, enhanced space, simplified design, and lighter weight. This is accomplished by a single, curved beam member that permits construction of an ergonomically advanced seat.

SUMMARY OF THE INVENTION

Therefore, it is an object of the invention to provide a passenger seat frame assembly that includes a minimum number of modular elements.

It is another object of the invention to provide a passenger seat that has a single laterally-extending structural beam supporting the seat.

It is another object of the invention to provide a passenger seat that has a single curved beam supporting the seat.

It is another object of the invention to provide a passenger seat that has a single beam positioned to allow greater underseat room for use by the passenger seated in the seat and a passenger seated aft of the seat.

These and other objects of the present invention are achieved in the preferred embodiments disclosed below by providing a passenger seat, comprising at least one leg assembly having fore and aft attachment elements for attachment to a supporting surface, a single laterally-extending beam carried by the leg assembly in vertically spaced-apart relation to the fore and aft attachment elements, and first and second laterally spaced-apart seat frames positioned on respective opposite sides of the leg assembly and mounted on the beam for being supported thereby.

According to one preferred embodiment of the invention, the beam is tubular.

According to another preferred embodiment of the invention, the beam comprises a hollow tube having an oval cross-section.

According to yet another preferred embodiment of the invention, the beam defines a concave curved shape wherein the beam at a connection point to the leg assembly is closer to the supporting surface than at the respective mounting points of the first and second seat frames.

According to yet another preferred embodiment of the invention, a passenger seat is provided, comprising a first and second laterally spaced-apart seat frames, and a single laterally-extending beam positioned between and carried by the first and second seat frames for supporting the first and second seat frames in vertically spaced-apart relation to a supporting surface. The passenger seat is adapted to be connected to and carried adjacent a passenger seat including a first and second laterally spaced-apart seat frames. A single laterally-extending beam is positioned between and carried by the first and second seat frames for supporting the first and second seat frames in vertically spaced-apart relation to a supporting surface. At least one leg assembly having fore and aft attachment elements is attached to a supporting surface.

According to yet another preferred embodiment of the invention, a passenger seat assembly comprises at least two laterally spaced-apart leg assemblies, each the leg assembly having fore and aft attachment elements for attachment to a supporting surface. A single laterally-extending beam is carried by the first and second leg assemblies in vertically spaced-apart relation to the for and aft attachment elements. A plurality of laterally spaced-apart seat frames are positioned on opposite sides of respective leg assemblies and mounted on the beam for being supported thereby. At least first and second laterally-positioned passenger seats, including respective seat backs and seat bottoms, are attached to and supported by the seat frames.

According to yet another preferred embodiment of the invention, four seat frames collectively carry and support first, second and third laterally positioned passenger seats. Four arm rest assemblies are carried by respective ones of the four seat frames. Each of the seat frames include an arm rest mounted for pivotal movement about a pivot member between a use position with an upper support surface in a horizontal position for supporting a forearm of a passenger seated in the seat and a stowed position wherein the upper support surface of the arm rest is perpendicular to the use position.

According to one preferred embodiment of the invention, the arm rest pivot member is mounted on the seat frame at a point forward of a plane defined by the seat back carried by the seat and above a point defined by the seat bottom for allowing the knee of an aft-seated passenger to occupy space behind the pivot member of the arm rest.

According to yet another preferred embodiment of the invention, the single beam defines a concave curved shape wherein the beam at a point intermediate any one of the four seat frames is closer to the supporting surface than at the respective mounting points of the beam to any one of the four seat frames.

According to yet another preferred embodiment of the invention, the at least two laterally spaced-apart leg assemblies are each positioned intermediate two respective seat frames.

According to yet another preferred embodiment of the invention, the single beam is tubular.

BRIEF DESCRIPTION OF THE DRAWINGS

Some of the objects of the invention have been set forth above. Other objects and advantages of the invention will appear as the invention proceeds when taken in conjunction with the following drawings, in which.

DESCRIPTION OF THE PREFERRED EMBODIMENT AND BEST MODE

Figure 1:
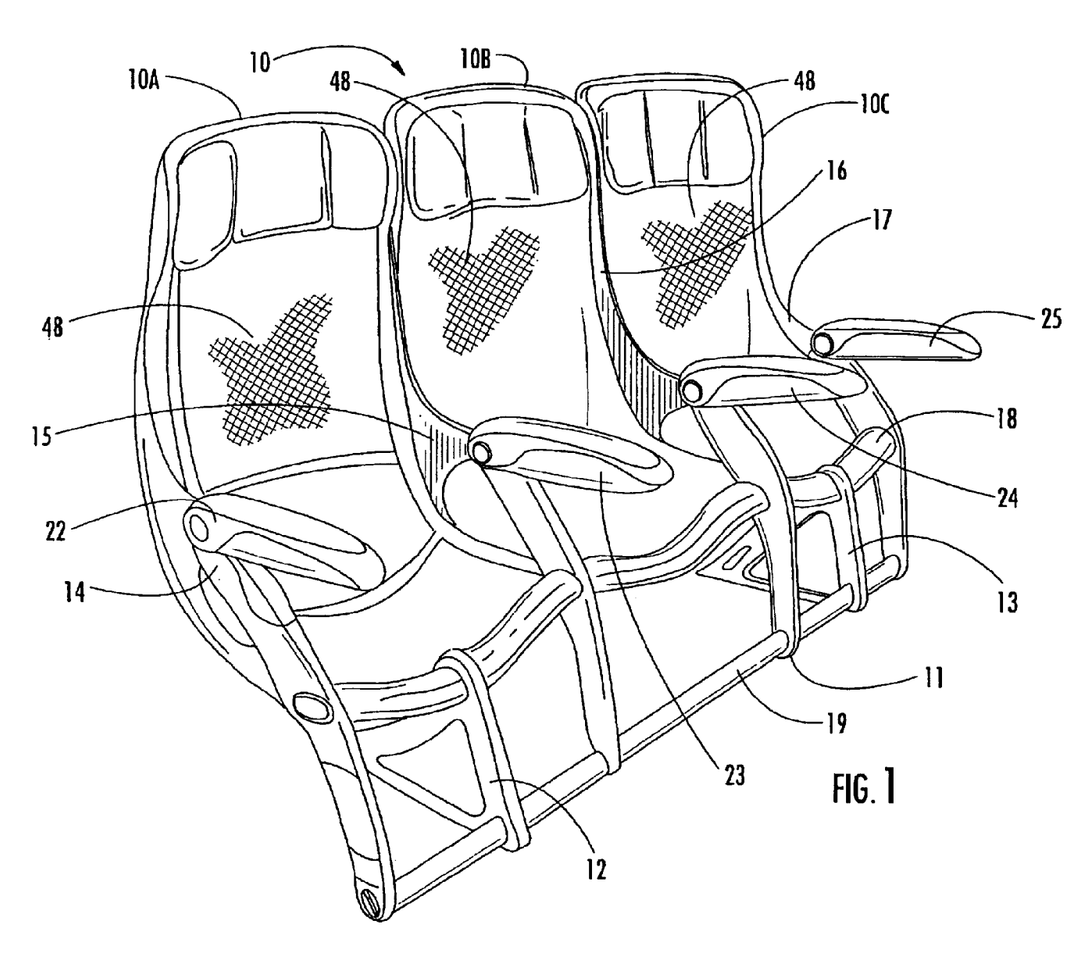
FIG. 1 is a perspective view of a three-seat assembly according to a preferred embodiment of the invention.

Referring now specifically to the drawings, a three-seat seat set according to the present invention is illustrated in FIG. 1 and shown generally at reference numeral 10 and comprises individual joined seats 10A, 10B, 10C that are movable from an upright to a recline position without encroaching on an aft-seated passenger. This type of seating is conventionally referred to as "coach" or "main cabin" seating as distinct from larger and more complex first class or business class seating. As will be seen below, the features of this invention are also applicable to first and business class seating. The seat set 10 includes a seat base 11. The seat base 11 includes a pair of leg assemblies 12 and 13 for being attached to a supporting surface by means of conventional track fittings such as disclosed in applicant's U.S. Pat. Nos. 4,776,533; 5,169,091 and 5,871,318. Four seat frames 14, 15, 16 and 17 are connected by single laterally-extending beam 18. A baggage guard rail 19 prevents baggage stowed under the seats 10A, 10B, 10C from sliding forward into the leg area of the passengers.

The beam 18 represents a radical departure from conventional seat design, where a pair of parallel fore-and aft beams provide support to the entire seat structure. The beam 18 is oval in cross-section and downwardly curved laterally across the front of each of the seats 10A, 10B, 10C. This combination of the oval cross-section and the curve provides sufficient strength to support the entire on the leg assemblies 12 and 13, thus eliminating the need for a second beam.

Each seat 10A, 10B, 10C thus includes a pair of the shared, laterally spaced-apart seat frames 14, 15, 16 and 17, each of which has a curved shape generally corresponding to the profile of an anatomically-appropriate generally horizontal seat bottom and generally vertical seat back, and includes an extension to the floor. Arm rests 22, 23, 24 and 25 are pivotally-mounted on respective seat frames 14, 15, 16 and 17.

Figure 2:
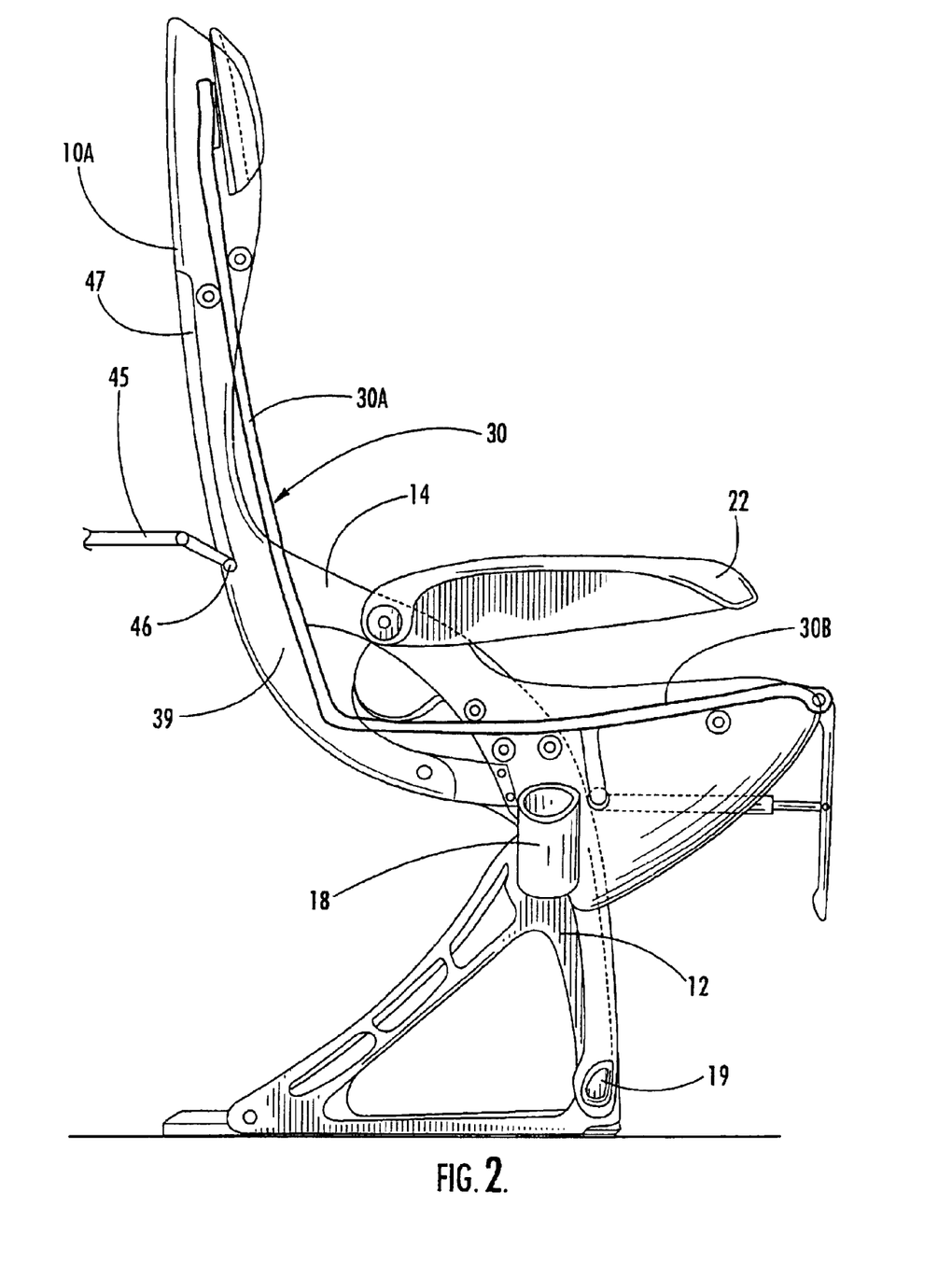
FIG. 2 is a side elevation of the seat assembly shown in FIG. 1, with interior components shown.
Figure 3:
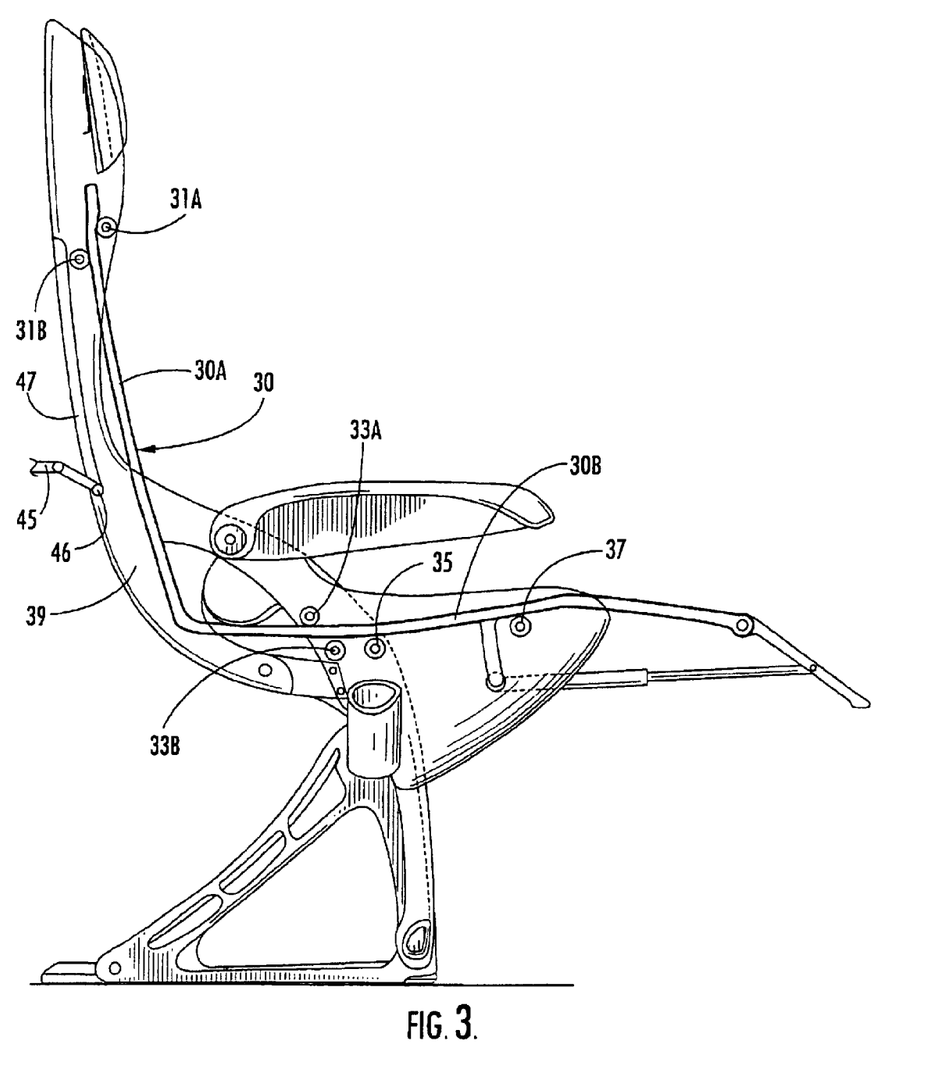
FIG. 3 is a side elevation similar to FIG. 2 with the leg rest extended.
Figure 4:
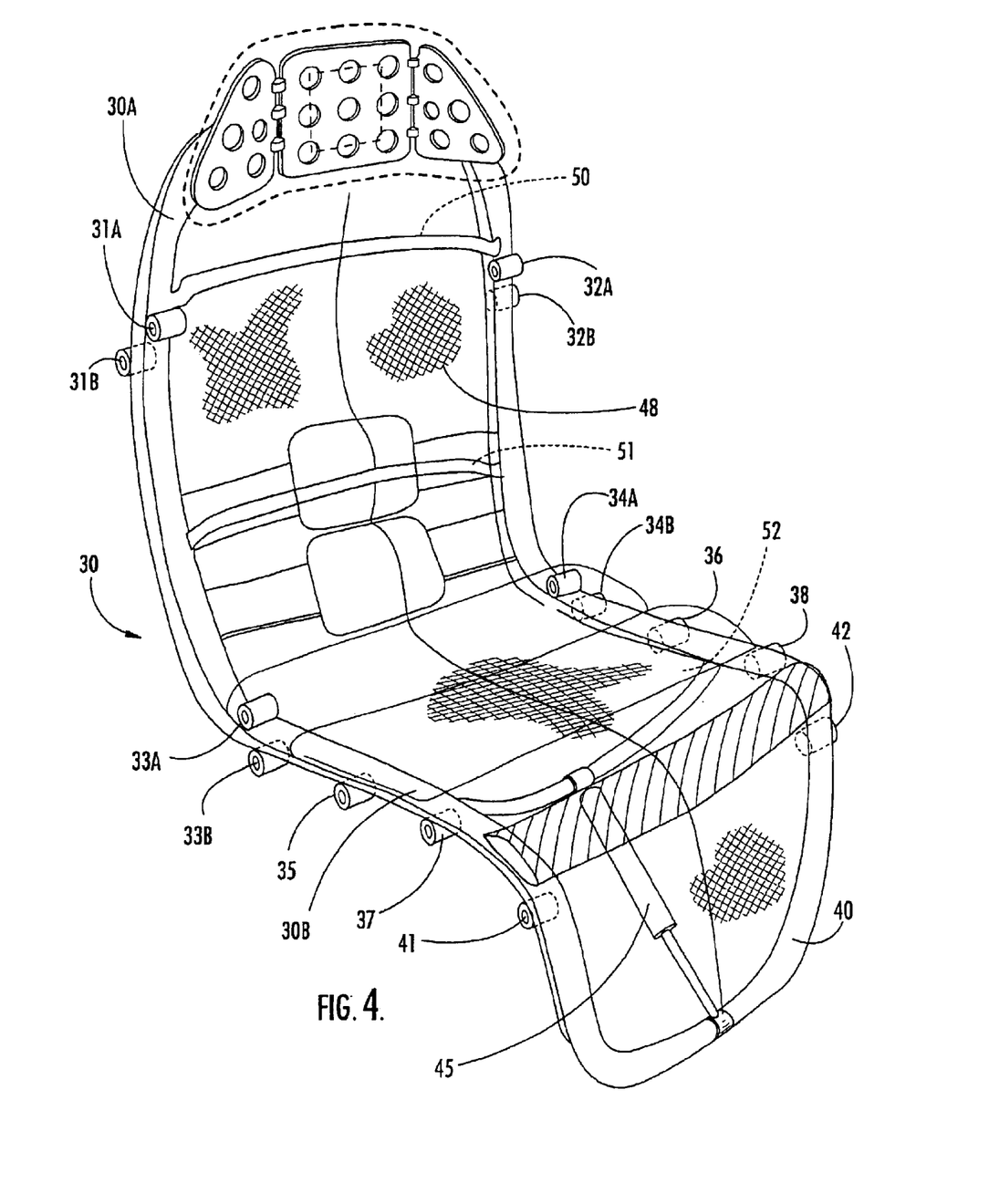
FIG. 4 is a perspective view of a unitary seating element according to a preferred embodiment of the invention.

Referring now to FIGS. 2, 3 and 4, seat 10A, exemplary of each of the seats 10A, 10B, 10C, has a curved, semi-rigid diaphragm support 30 carried by seat frames 14, 15 in alignment with the curved shape of the seat frames 14, 15 and mounted for movement relative to the seat frames 14, 15 between a first, upright position, FIG. 2, and a second, reclined position, FIG. 3. The diaphragm support 30 is preferably made of a controlled flex material, such as a laminated composite carbon fiber resin. This material is well-known as a lightweight, durable and relatively inert material particularly suitable for aircraft use. Other materials having similar characteristics may also be used, including various polymers, particularly including nonflammable polymers. The support 30 is molded into the desired shape using conventional carbon fiber molding and fabrication techniques, and forms a seat back 30A and a seat bottom 30B.

The diaphragm support 30 is mounted on the seat frames 14, 15 by means of sets of cooperating rollers between which the diaphragm support 30 is captured. As is best shown in FIG. 4, rollers 31A, 31B and 32A, 32B and 33A, 33B and 34A, 34B are carried by the seat frames 14, 15 and engage the front and back sides of the diaphragm support 30 to provide roller surfaces against which the diaphragm support 30 rides. The forward portion of the seat bottom is supported by rollers 35, 36 and 37, 38, also carried by the seat frames 14, 15. The foot rest 40 is pivotally-mounted on pivot pins 41, 42 for movement between a retracted position, FIGS. 2 and 4, and an extended position, FIG. 3. The foot rest 40 is extended and retracted by a conventional gas strut.

The diaphragm support 30 is covered by a diaphragm 48 in the form of a fabric seat suspension material such as a material made by DuPont and sold under the trademark DYMETROL 200, or a unidirectional fabric sold under the trademark CRYSTAL FLEX, or any other suitable fabric. The material 48 is stretched onto the diaphragm support 30 under tension and provides a seating surface.

As is shown by comparing FIGS. 2 and 3, passenger recline is achieved by translation of the diaphragm support 30 downwardly relative to the seat frames 14, 15. The rollers 31A, 31B, 32A, 32B, 33A, 33B, 34A, 34B, 35, 36, 37 and 38 permit the diaphragm support 30 to translate within a narrow range of motion. The weight of the passenger is sufficient to cause the diaphragm support 30 to slide downwardly. The diaphragm support 30 is locked into position as desired by a piston and cylinder assembly, not shown, positioned under the seat 10A, such as a MECHLOCK linear locking device manufactured by P. L. Porter Controls, Inc. Leg pressure is used to raise and lock the seat in a desired position.

The seats 10A, 10B, 10C are trimmed with a protective and decorative shell 39, within which the structural components and operative elements of the seat are enclosed and protected. A meal tray 45 is mounted on a pivot 46 for movement between a horizontal use position and a vertical stowed position in a recess 47 in the shell 39.

The above-described seat design has the effect of causing the passenger to recline by rotating the passenger about a pivot point in the area of the hips. The passenger's back moves downwardly and the legs move upwardly, maintaining the same relative body position. This provides a more comfortable recline position without the tendency of the passenger to merely slide forward on the seat bottom when the seat back is reclined.

Curved stretchers 50, 51, 52 extend between opposite sides of the diaphragm support 30 and maintain the width of the diaphragm 30 and thus the tension on the diaphragm 48.

Figure 5:
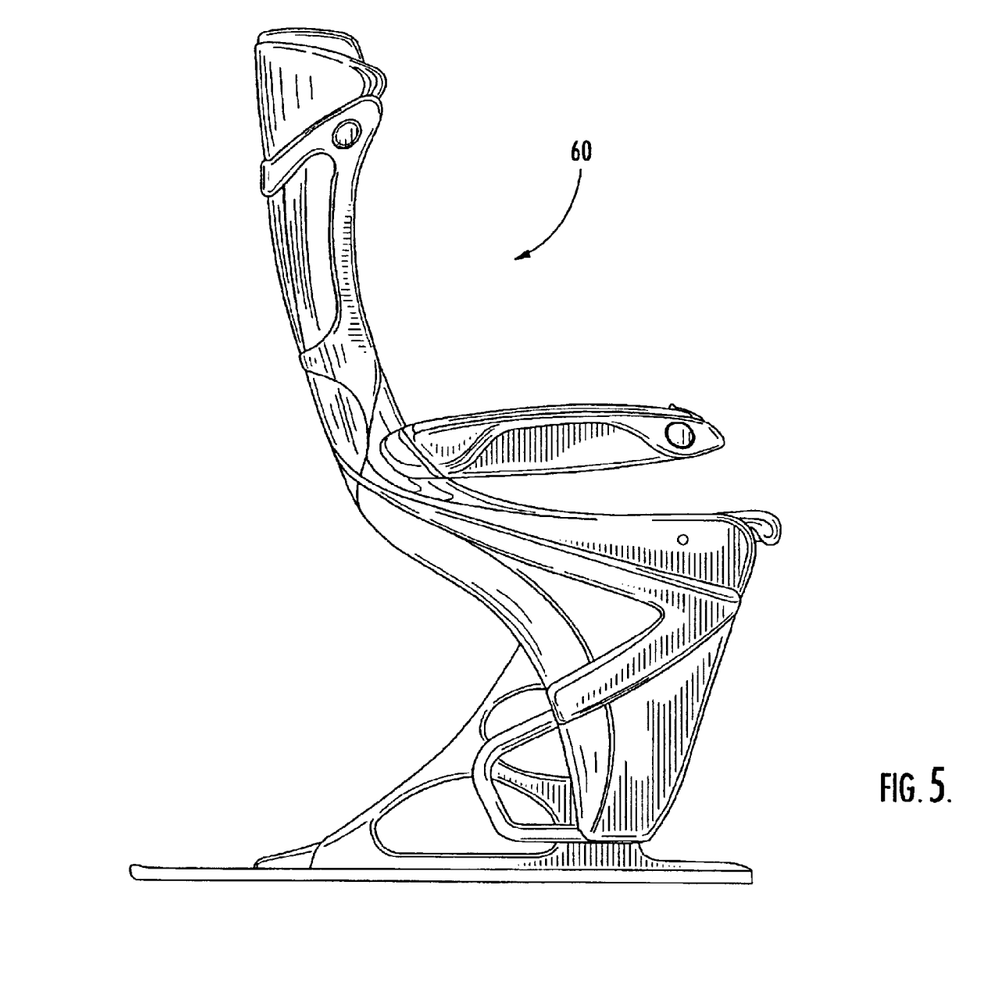
FIG. 5 is a right side elevation of an alternative embodiment of the present invention.
Figure 8:
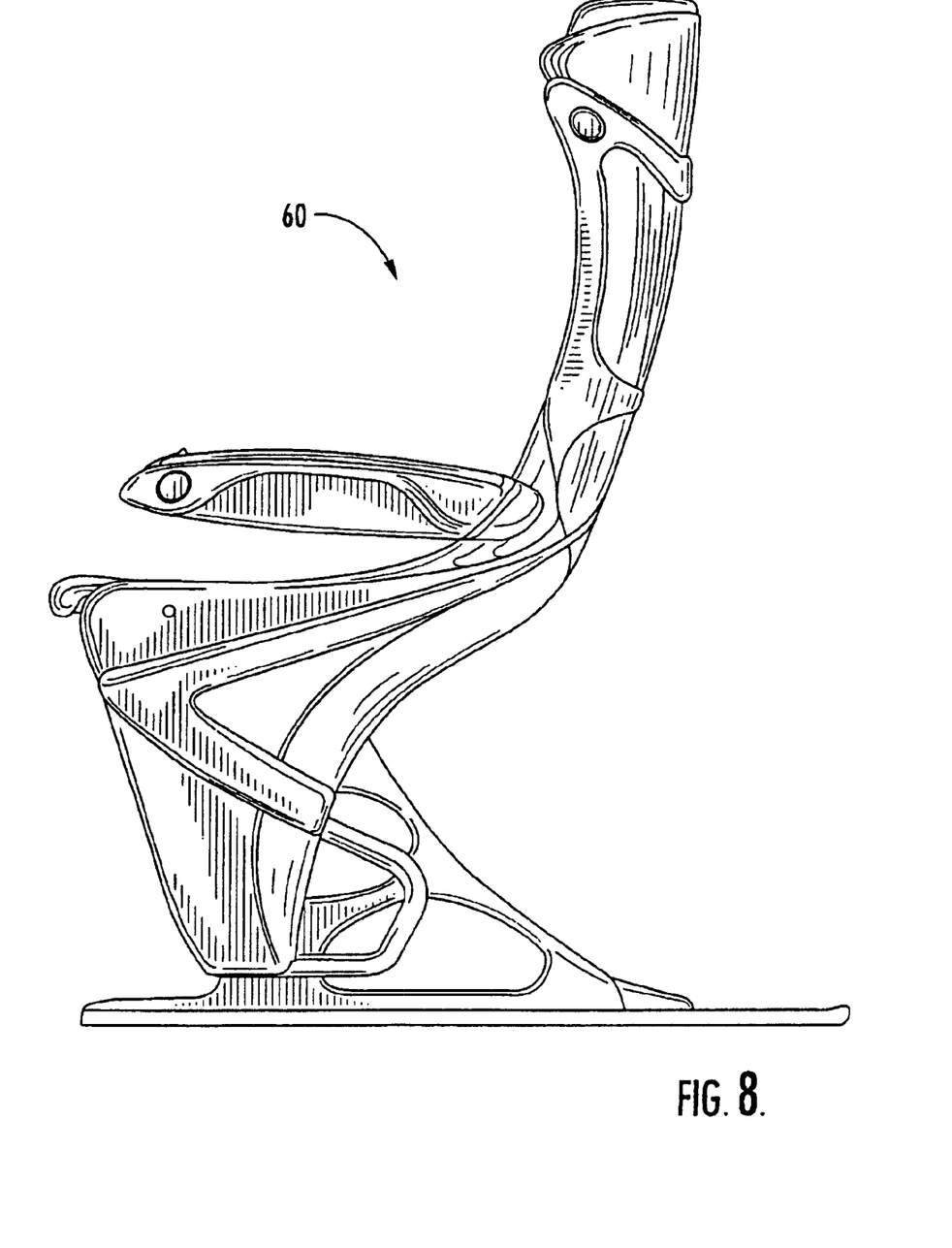
FIG. 8 is a left side elevation of the seat shown in FIG. 5.

A alternative embodiment of the seat 10A is shown in FIGS. 5 and 8 at reference number 60.

Figure 6:
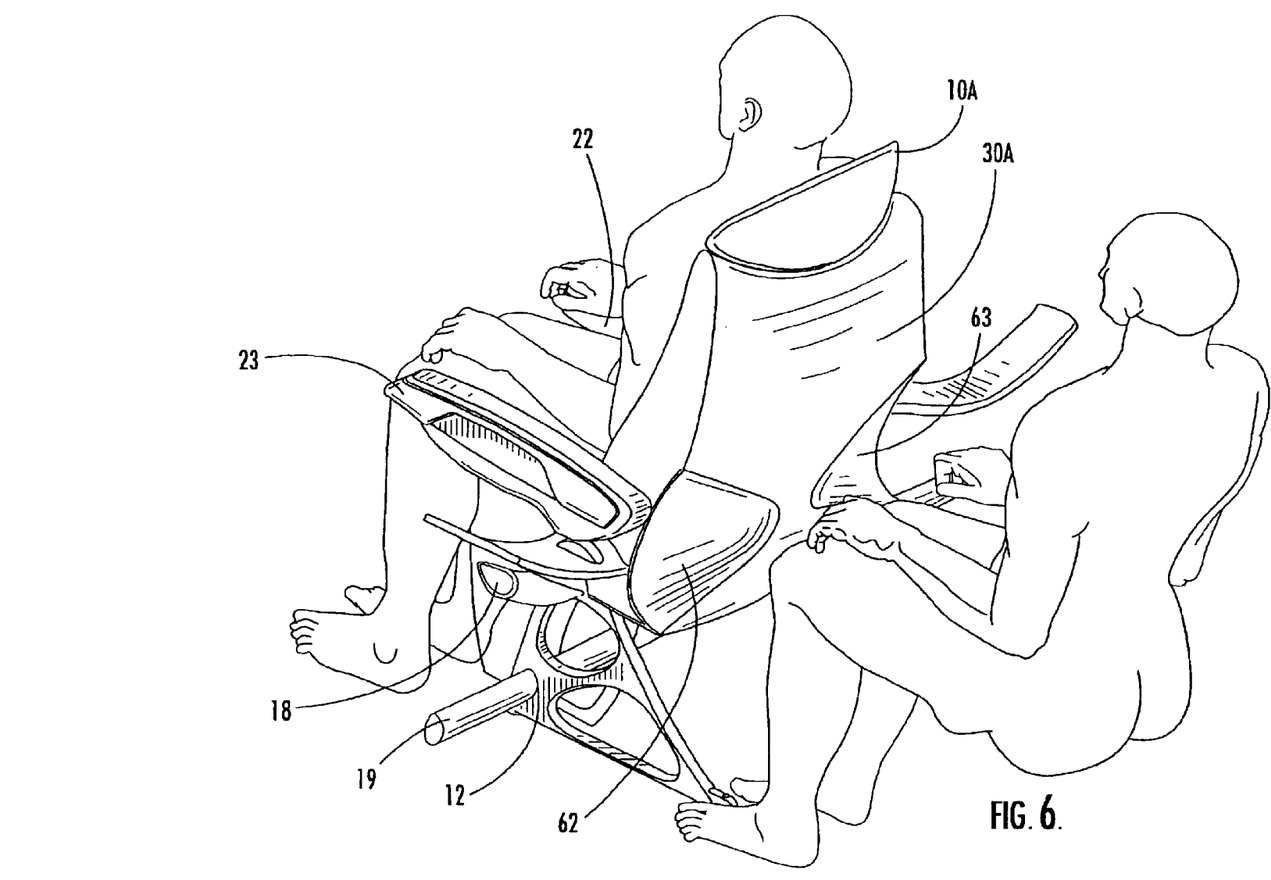
FIG. 6 is a rear perspective view showing the seat arm rest and its relationship to knee room available to an aft-seated passenger, in partial assembly with seating elements removed for clarity.

Referring now to FIG. 6, the view demonstrates features that result from moving the arm rest pivot forwardly and the absence of the aft beam present in prior art seats. As is shown, the pivot of the arm rest 23 is now at a point directly under the elbow of the passenger, and does not extend rearwardly into the plane of the seat back. Without the requirement to provide space between adjacent seat backs for the stowed arm rest to reside, the seat back can be made wider, and the area where the arm rest pivot would normally be positioned can be made available for other uses. As shown in FIG. 6, the seat back 30A includes two concave, inwardly-dished areas 62, 63 that reside forwardly of the knee areas of the aft-seated passenger. These areas provide greater knee clearance for all passengers and particularly for taller passengers whose knees are typically within several inches of the seat back, it not actually touching. This, in combination with the above-described seat back design features that avoid aft movement of the seat back 30A when the passenger reclines the seat, provides an ergonomic design that provides greater comfort for both the forward and the aft-seated passengers.

Figure 7:
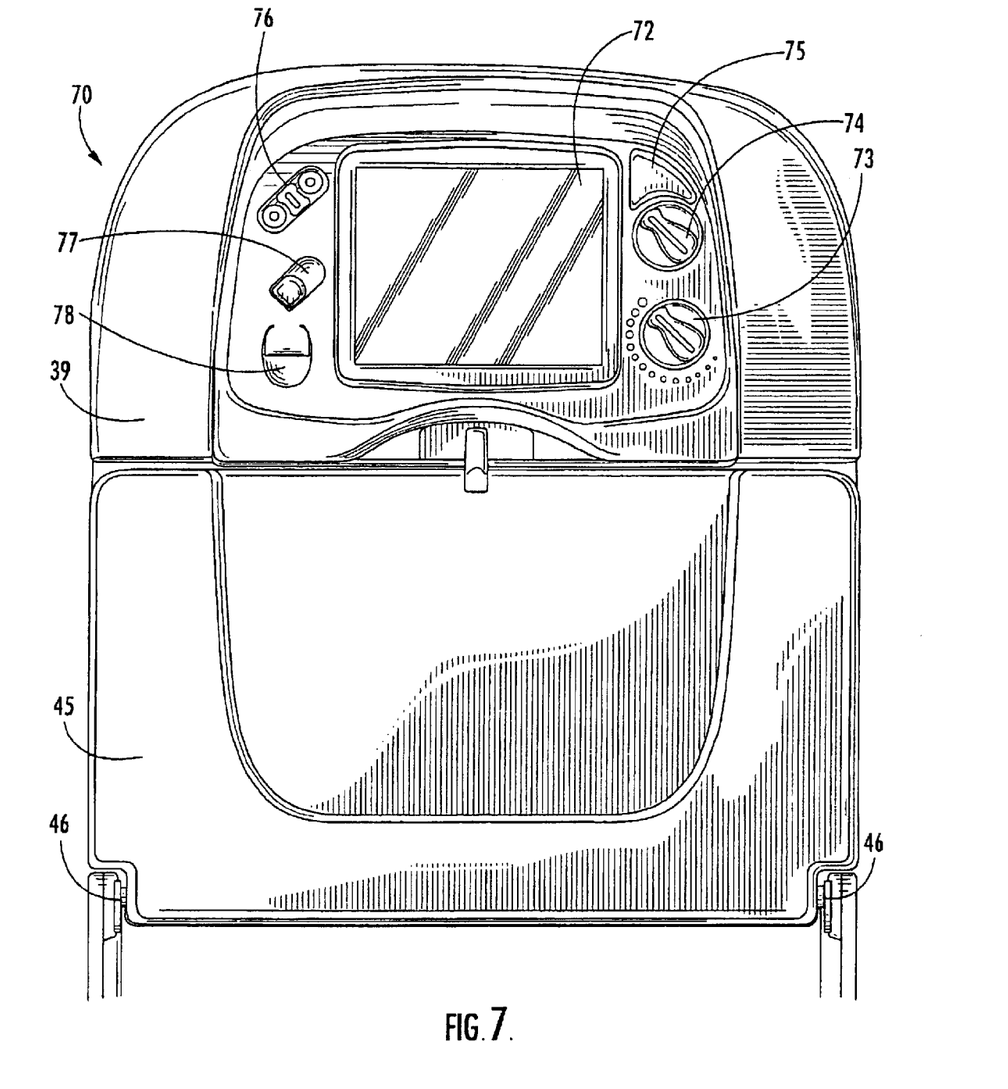
FIG. 7 is a elevation of the rear of a seat back that may be used on a seat according the present invention.

Referring now to FIG. 7, a view of the rear side of a seat back 70 according to one embodiment of the invention is shown. In this particular embodiment, the rear of the seat above the meal tray 45 is provided with a audio/video system that includes a video screen 72. In addition, all of the audio/video controls, the flight attendant call button, reading light, and seat adjustment controls are positioned on the seat back 70 around the video screen 72 in a desired arrangement at reference numerals 73–78. This position is much more accessible than controls that are now often positioned on the inside face of the arm rest where they are hard to see and operate.

Of course, any desired combination of controls can be positioned as shown, with other controls in their conventional positions. Control cables are routed from seat 10A and overhead-positioned features such as lighting to a forward-positioned seat back by a wiring chase positioned on the deck of the aircraft, through the bulkheads. Certain functions may be controlled by a wireless system.

This design illustrates further advantages obtained by maintaining the seat back in a stationary position. The video screen 72 does not move and thus does not require a mechanism to pivot the screen 72 to compensate for movement of the seat back. All of the controls on the seat back 39 are easy to see and reach by the passenger.

Figure 9:
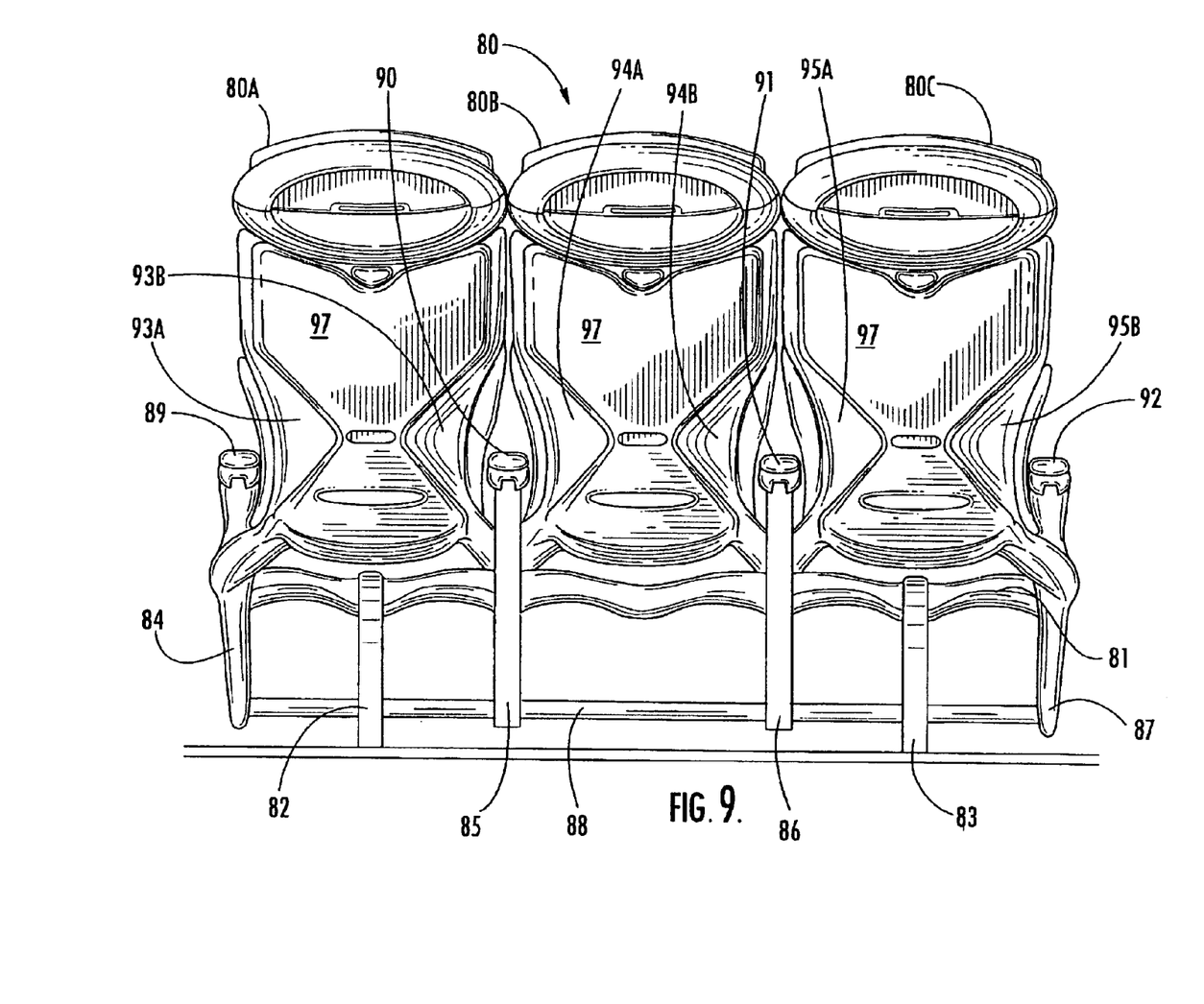
FIG. 9 is a rear view of a three-seat assembly according to one embodiment of the invention.
Figure 10:
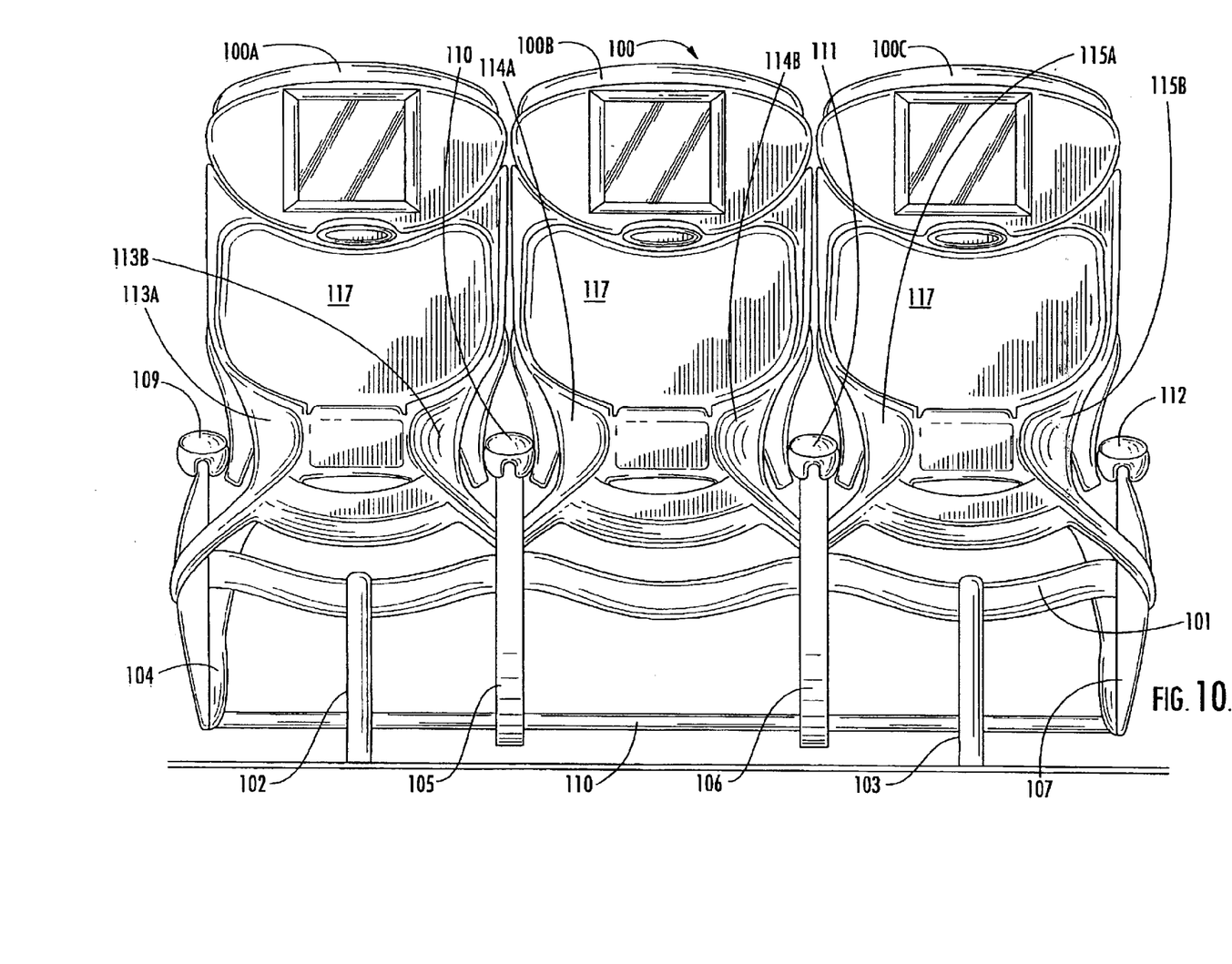
FIG. 10 is a rear view of a three-seat assembly according to one embodiment of the invention.

Referring now to FIGS. 9 and 10, two further embodiments of seat sets according to the invention are shown at 80 and 100, respectively.

Seat set 80 includes three seats 80A, 80B, 80C mounted on a single curved tubular beam 81, as described above, carried by two leg assemblies 82, 83. The seats 80A, 80B, 80C are also supported by seat frames 84, 85, 86, 87 that carry a baggage guard rail 88. Forward-pivoted arm rests 89, 90, 91 and 92 are carried by the seat frames 84, 85, 86, 87. Concave, inwardly-dished areas 93A, 93B, 94A, 94B, and 95A, 95B, as described above, in the seat back provide additional knee room to the passenger seated aft of the seats 80A, 80B, 80C. Each of the seats 80A, 80B, 80C have a meal tray 97.

Seat set 100 includes three seats 100A, 10B, 100C mounted on a single curved tubular beam 101, as described above, carried by two leg assemblies 102, 103. The seats 100A, 100B, 100C are also supported by seat frames 104, 105, 106, 107 that carry a baggage guard rail 110. Forward-pivoted arm rests 109, 110, 111 and 112 are carried by the seat frames 104, 105, 106, 107. Concave, inwardly-dished areas 113A, 113B, 114A, 114B, and 115A, 115B, as described above, in the seat back provide additional knee room to the passenger seated aft of the seats 100A, 100B, 100C. Each of the seats 100A, 100B, 100C have a meal tray 117.

A passenger seat is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

I claim:

1. A passenger seat, comprising:
   (a) at least one leg assembly having fore and aft attachment elements for attachment to a supporting surface, each of said leg assemblies comprising:
      (i) a longitudinally-extending lower member having forward and aft ends which carry said fore and aft attachment elements respectively;
      (ii) a first upwardly-extending member attached to said forward end of said lower member and having upper and lower ends; and
      (iii) a second upwardly-extending member attached to said aft end of said lower member and having upper and lower ends, wherein the upper ends of said first and second upwardly-extending members are joined to each other to define a beam mounting point;
   (b) a single laterally-extending beam carried by the leg assembly in vertically spaced-apart relation to the fore and aft attachment elements, said beam being attached to said leg assembly at said beam mounting point; and
   (c) first and second laterally spaced-apart seat frames positioned on respective opposite sides of the leg assembly and mounted on the beam for being supported thereby, wherein each of said seat frames extends rearwardly from said laterally-extending beam, such that substantially all loads from a passenger seated in said seat are transferred to said leg assembly through said laterally-extending beam and wherein said beam defines a concave curved shape at a location where said beam is connected to the leg assembly.

2. A passenger seat according to claim 1, wherein said beam is tubular.

3. A passenger seat according to claim 1, wherein said beam comprises a hollow tube having on oval cross-section.

4. A passenger seat assembly, comprising:
   (a) at least two laterally spaced-apart leg assemblies, each said leg assembly having fore and aft attachment elements for attachment to a supporting surface, each of said leg assemblies comprising:
      (i) a longitudinally-extending lower member having forward and aft ends which carry said fore and aft attachment elements respectively;
      (II) a first upwardly-extending member attached to said forward end of said lower member and having upper and lower ends; and
      (ii) a second upwardly-extending member attached to said aft end of said lower member and having upper and lower ends; wherein the upper ends of said first and second upwardly-extending members are joined to each other to define a beam mounting point;

(b) a single laterally-extending beam carried by the first and second leg assemblies in vertically spaced-apart relation to the for and aft attachment elements, said beam being attached to said leg assemblies to said beam mounting points;

(c) a plurality of laterally spaced-apart seat frames positioned on opposite sides of respective leg assemblies and mounted on the beam for being supported thereby; wherein said beam defines a concave curved shape at a location where said beam is connected to the leg assembly and (d) at least first and second laterally-positioned passenger seats, including respective seat backs and seat bottoms, attached to and supported by the seat frames, wherein each of said seat frames extends rearwardly from said laterally-extending beam, such that substantially all loads from a passenger seated in said seats are transferred to said leg assemblies through said laterally-extending beam.

5. A passenger seat according to claim 4, and including:
(a) four seat frames collectively carrying and supporting first, second and third laterally positioned passenger seats; and
(b) four arm rest assemblies carried by respective ones of the four seat frames, each of the seat frames including an arm rest mounted for pivotal movement about a pivot member between:
 (i) a use position with an upper support surface in a horizontal position for supporting a forearm of a passenger seated in the seat;
 (ii) a stowed position wherein the upper support surface of the arm rest is perpendicular to the use position.

6. A passenger seat according to claim 5, wherein the arm rest pivot member is mounted on the seat frame at a point sufficiently forward of a plane defined by the seat back carried by the seat and above a point defined by the seat bottom so as to allow for allowing the knee of an aft-seated passenger to occupy space behind the pivot member of the arm rest and between two adjacent seat backs.

7. A passenger seat according to claim 5, wherein the single beam defines a concave curved shape wherein the beam at a point intermediate any one of the four seat frames is closer to the supporting surface then at the respective mounting points of the beam to any one of the four seat frames.

8. A passenger seat according to claim 7, wherein the at least two laterally spaced-apart leg assemblies are each positioned intermediate two respective seat frames.

9. A passenger seat according to claim 7, wherein the single beam is tubular.

* * * * *